No. 628,970.  
D. WARD.  
BAND CUTTER AND FEEDER.  
(Application filed Aug. 13, 1898.)  
(No Model.)  
Patented July 18, 1899.
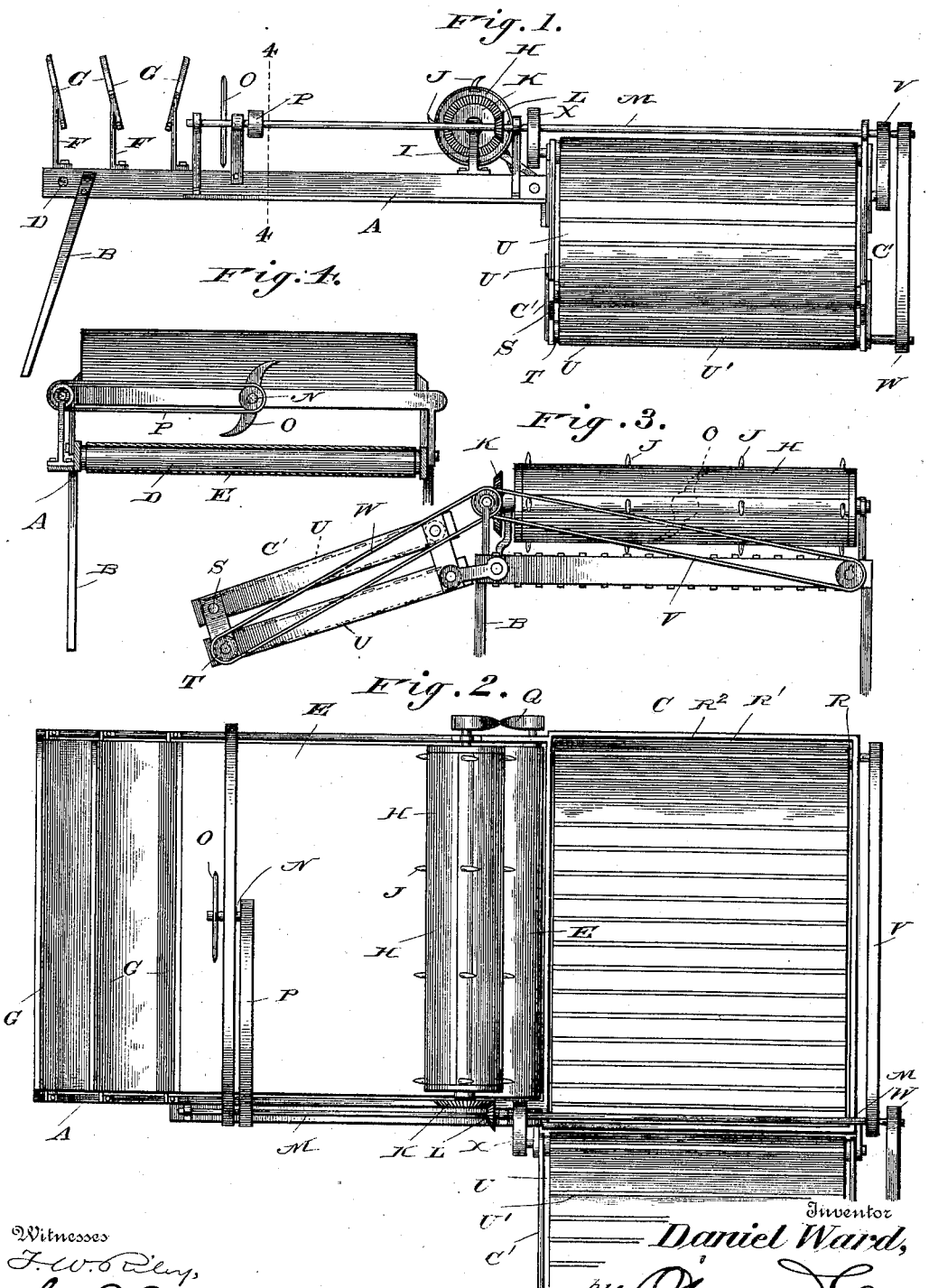

UNITED STATES PATENT OFFICE.

DANIEL WARD, OF PEORIA, ILLINOIS, ASSIGNOR OF ONE-HALF TO WILLIAM J. SHANNON, OF SAME PLACE.

BAND-CUTTER AND FEEDER.

SPECIFICATION forming part of Letters Patent No. 628,970, dated July 18, 1899.

Application filed August 13, 1898. Serial No. 688,477. (No model.)

*To all whom it may concern:*

Be it known that I, DANIEL WARD, a citizen of the United States, residing at Peoria, in the county of Peoria and State of Illinois, have invented a new and useful Band-Cutter and Feeder, of which the following is a specification.

This invention relates to improvements in band-cutters and feeders; and the object thereof is to provide a simple and improved construction which will effectively cut the bands and feed the grain to the thresher.

With the above object in view the invention consists of an endless carrier, guides to receive the bundles of grain and guide the same to said carrier, a rotary band-cutter adapted to cut the band as the bundle passes thereby upon the carrier, a rotary feeder at the opposite end of said carrier adapted to engage the grain and feed the same to an endless carrier extending transversely of the first-mentioned carrier, and two endless carriers receiving the grain therebetween from the transversely-extending carrier and conveying the same to the cylinder of the threshing-machine.

The invention consists in the novel details of construction hereinafter fully described in the specification, particularly pointed out in the claim, and illustrated by the accompanying drawings, in which—

Figure 1 is a side elevation of my improved band-cutter and feeder. Fig. 2 is a top plan view. Fig. 3 is an end elevation. Fig. 4 is a cross-section on the line 4 4 of Fig. 1.

Referring now more particularly to the accompanying drawings, A designates the main frame, supported at one end by the legs B and at its opposite end having the transversely-extending frame C, having at one end the downwardly-inclined frame C', which at its free end is supported by the frame of the threshing-machine. Journaled adjacent to the respective ends of frame A are the transversely-extending rollers D, around which the endless carrier belt or apron E passes. Supported upon arms F at the forward end of frame A are the transversely-extending inclined boards G, which form guides to receive the bundles of grain and guide the same to the endless carrier. At the opposite end of frame A is a cylinder H, having its journals adjustable in supporting-arms I, so that the cylinder may be adjusted vertically and having about its periphery a plurality of curved feeding-teeth J. Upon one of the journals of this cylinder a bevel-gear K is fixed, the same meshing with a bevel-pinion L upon a longitudinally-extending shaft M, supported in suitable arms, said shaft receiving its power through the medium of a belt connecting the same with the driving-shaft of the threshing-machine. A short shaft N is journaled adjacent to the guide-boards G and at a point intermediate the side bars of the frame A and carries the band-cutter O, which is intermediately secured thereon and formed with opposite cutting edges, thus constituting a double cutter. This shaft is driven by means of a belt P from shaft M. The carrier E is driven by a belt Q from one of the journals of cylinder H.

Journaled at the respective ends of the frame C are the rollers R, around which passes an endless carrier belt or apron R', having the transversely-extending ribs $R^2$. Journaled in frame C', at its respective ends, are the upper and lower rollers S and T, around which the endless carriers or aprons U pass, said aprons being provided with the transversely-extending ribs U'. Carrier R' is driven by a belt V from shaft M and the lower carrier of the pair of carriers U by a belt W from said shaft, while the upper carrier is driven by a belt X, also from said shaft.

The operation of my invention is as follows: The bundles of grain are placed between the inclined guide-boards G and are guided to position upon carrier E. As they are moved upon said carrier the rotary band-cutter O cuts the band, so that the bundle is loose when the same reaches the rotary feeder. The grain is engaged by the curved teeth of the rotary feeder and deposited upon carrier R', by which it is conveyed to and deposited between the carriers U. These carriers engaging the grain upon the top and bottom thereof readily feed the same to the cylinder of the threshing-machine.

Having thus fully described my invention, what I claim as new, and desire to secure by Letters Patent of the United States, is—

In a band-cutter and feeder, the combination with the frame of the machine, of a series of guide-boards mounted transversely thereof to insure the lodgment of the bundles at right angles to the length of the frame, transverse shafts and rollers mounted in the frame, a feeding-carrier extending and moving longitudinally of the frame below and beyond said guide-boards upon which the bundles are received in transverse positions a longitudinal shaft mounted above the carrier, a band-cutter upon said shaft, and a transverse roller at the delivery end of the carrier having curved teeth to feed and spread the bundles, a transverse frame, at the delivery end of the carrier E, a carrier moving in said frame transversely to the movement of carrier E to receive the bundles from said carrier in line with its movement, a supplementary frame at the end of the transverse frame, pivotal arms connecting it therewith, and upper and lower carriers to receive the grain between them and carry it direct to the threshing-cylinder, substantially as described.

DANIEL WARD.

Witnesses:
W. J. SHANNON,
E. E. HARDING.